United States Patent
Kessler et al.

(10) Patent No.: US 9,330,002 B2
(45) Date of Patent: May 3, 2016

(54) MULTI-CORE INTERCONNECT IN A NETWORK PROCESSOR

(75) Inventors: Richard E. Kessler, Northborough, MA (US); David H. Asher, Sutton, MA (US); John M. Perveiler, Oxford, MA (US); Bradley D. Dobbie, Boston, MA (US)

(73) Assignee: Cavium, Inc., San Jose, CA (US)

( * ) Notice: Subject to any disclaimer, the term of this patent is extended or adjusted under 35 U.S.C. 154(b) by 972 days.

(21) Appl. No.: 13/285,629

(22) Filed: Oct. 31, 2011

(65) Prior Publication Data

US 2013/0111141 A1 May 2, 2013

(51) Int. Cl.
G06F 12/00 (2006.01)
G06F 12/08 (2016.01)

(52) U.S. Cl.
CPC .......... *G06F 12/0813* (2013.01); *G06F 12/08* (2013.01)

(58) Field of Classification Search
USPC .......................................................... 711/5
See application file for complete search history.

(56) References Cited

U.S. PATENT DOCUMENTS 7,290,116 B1 10/2007 Grohoski et al.

FOREIGN PATENT DOCUMENTS

WO WO 2005/020079 3/2005

OTHER PUBLICATIONS

Notification of Transmittal of International Search Report and Written Opinion of the International Searching Authority of PCT/US2012/062378, date of mailing, Jan. 30, 2013.
"Cavium Networks Unveils OCTEON II CN68XX—Industry's Highest-Performance Multi-Core Processors for Energy-Efficient Data Center, Mobile Internet and the Borderless Enterprise" (May 10, 2010).
Notification Concerning Transmittal of International Preliminary Report on Patentability of PCT/US2012/062378, "Multi-Core Interconnect in a Network Processor," date of mailing May 15, 2014.

*Primary Examiner* — Matthew Bradley
(74) *Attorney, Agent, or Firm* — Hamilton, Brook, Smith & Reynolds, P.C.

(57) ABSTRACT

A network processor includes multiple processor cores for processing packet data. In order to provide the processor cores with access to a memory subsystem, an interconnect circuit directs communications between the processor cores and the L2 Cache and other memory devices. The processor cores are divided into several groups, each group sharing an individual bus, and the L2 Cache is divided into a number of banks, each bank having access to a separate bus. The interconnect circuit processes requests to store and retrieve data from the processor cores across multiple buses, and processes responses to return data from the cache banks. As a result, the network processor provides high-bandwidth memory access for multiple processor cores.

8 Claims, 6 Drawing Sheets

MULTI-CORE INTERCONNECT IN A NETWORK PROCESSOR

BACKGROUND

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

SUMMARY

Embodiments of the present invention provide a system for controlling data transfer and processing in a network processor. An interconnect circuit directs communication between a group of plural processor cores and a cache. A plurality of memory buses each connect a respective group of plural processor cores to the interconnect circuit. The cache is divided into a plurality of banks, where each bank is connected to the interconnect circuit through an individual bus. The interconnect circuit provides for distributing requests received from the plural processor cores among the cache banks.

In further embodiments, the interconnect circuit may transform the requests by modifying an address component of the requests. This transformation can include performing a hash function on each of the requests, which provides for a pseudorandom distribution of the requests among the plurality of banks. The interconnect circuit or cache banks may further be configured to maintain tags indicating a state of an L1 cache coupled to the plural processor cores. The interconnect circuit may direct tags in the received requests to a plurality of channels, thereby processing multiple tags concurrently.

In still further embodiments, the interconnect circuit may include a number of data output buffers. Each of the data output buffers may receive data from each of the plurality of banks, and output data through a respective one of the memory buses. The interconnect circuit can also include a number of request buffers, where each of the request buffers receives requests from each group of processors and outputs the request to a respective one of the of banks.

In further embodiments, one or more bridge circuits may be coupled to the memory buses. The bridge circuits may connect the processor cores to one or more on-chip co-processor. Further, to maintain memory coherency, the cache banks may delay transmitting a commit signal to the plural processor cores. The cache banks may then transmit the commit signal in response to receiving an indication that invalidate signals have been transmitted to the entirety of the plural processor cores. The interconnect circuit and plurality of memory buses may be configured to control invalidates to reach an L1 cache in less time than a time required for a commit to reach one of the plurality of banks and a subsequent signal to reach one of the plural processor cores receiving the invalidate.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Before describing example embodiments of the present invention in detail, an example network security processor in which the embodiments may be implemented is described immediately below to help the reader understand the inventive features of the present invention.

Figure 1:
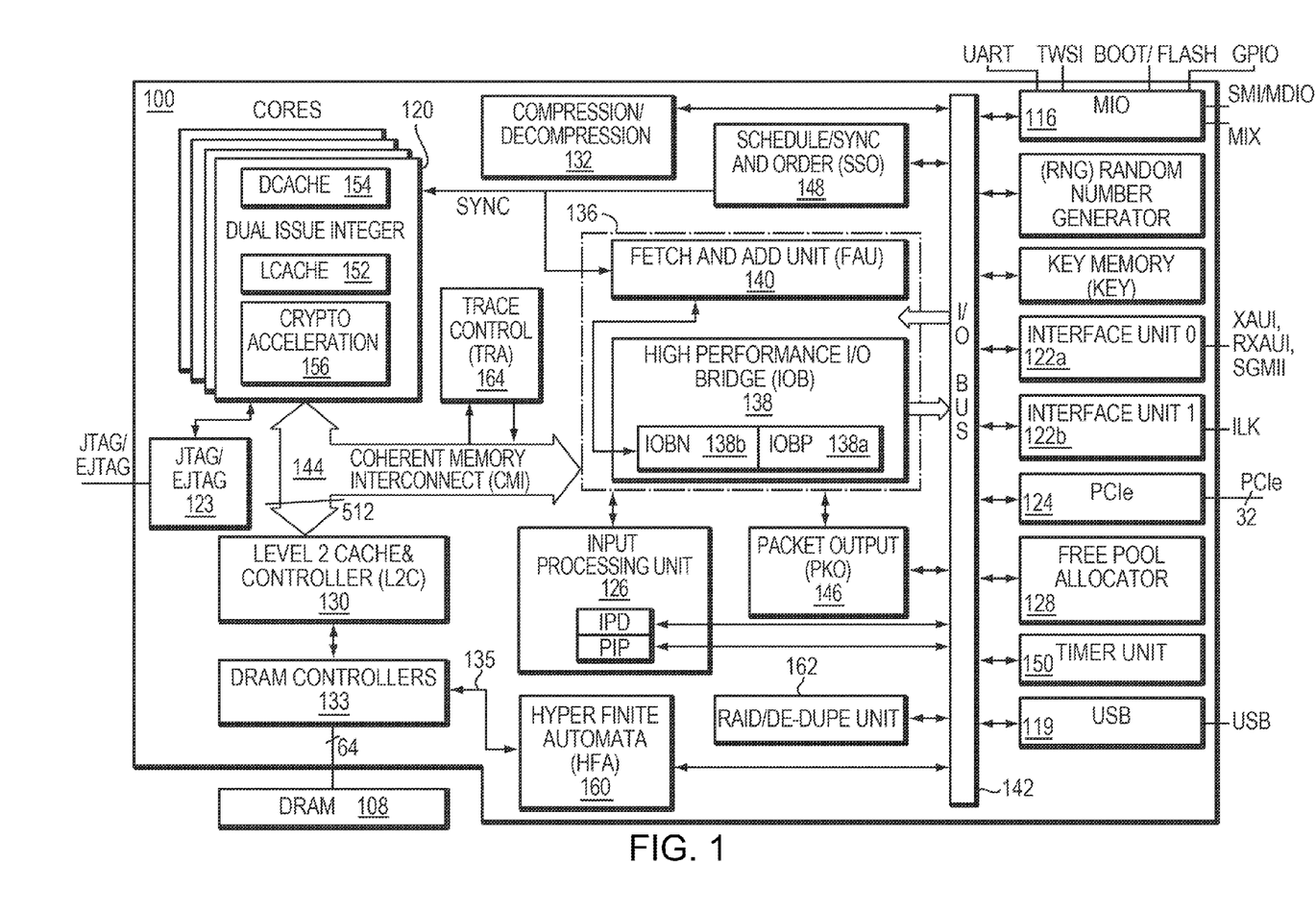
FIG. 1 is a block diagram illustrating a network services processor in which embodiments of the present invention may be implemented.

FIG. 1 is a block diagram illustrating a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCI interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122*b* can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138*a* and an I/O Bus Bridge (IOBN) 138*b*. The I/O Packet Bridge 138*a* is configured to manage the overall protocol and arbitration and provide coherent I/O portioning with primarily packet input and output. The I/O Bus Bridge 138*b* is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, DRAM 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

Embodiments of the present invention may be implemented in the network services processor 100 shown in FIG. 1, and may be directed more particularly to the packet output unit (PKO) 146, as well as the interface units 122. Example embodiments are described in further detail below with reference to FIGS. 2-4.

Figure 2:
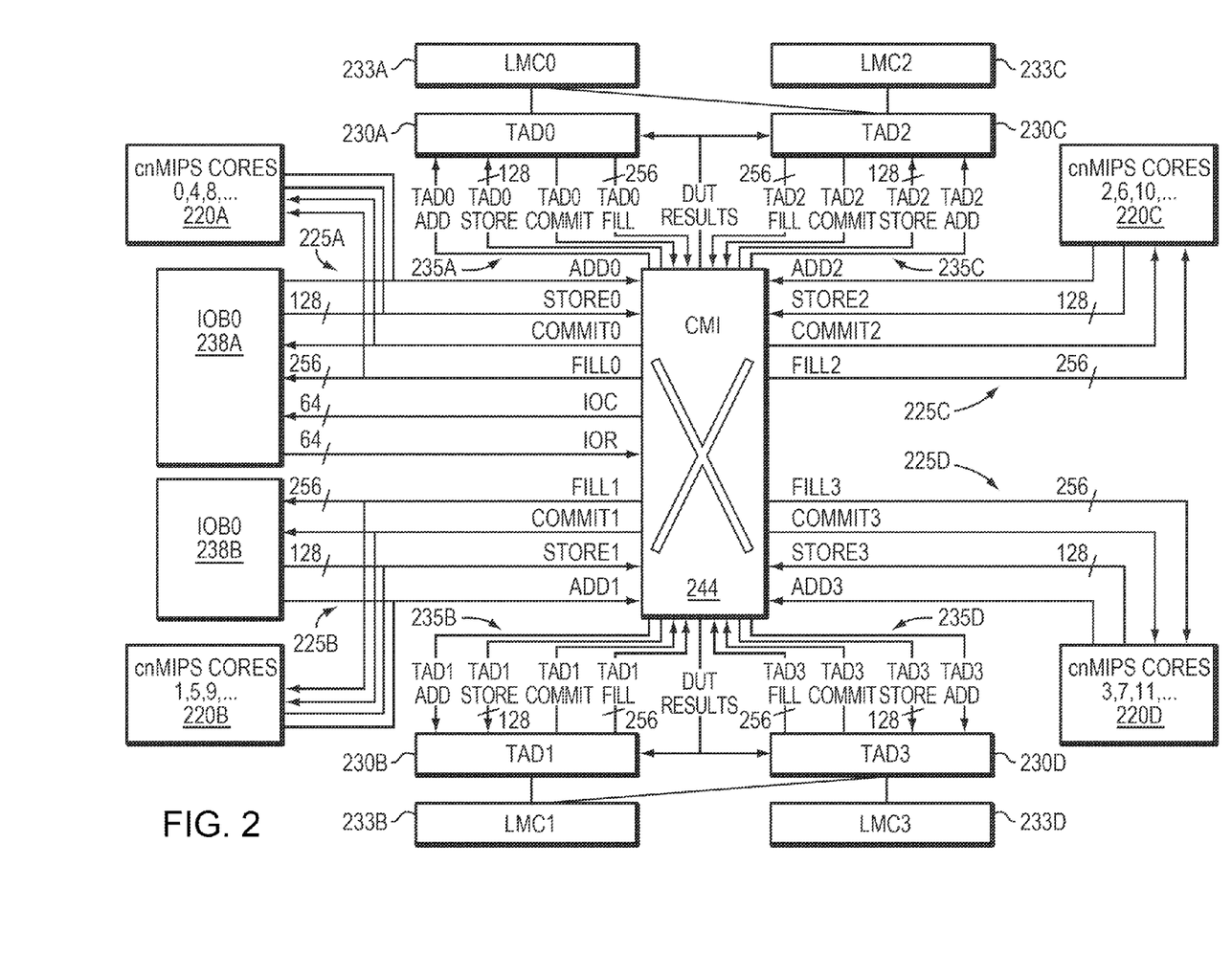
FIG. 2 is a block diagram of a coherent memory interconnect (CMI) circuit and associated components in one embodiment.

FIG. 2 is a block diagram of a coherent memory interconnect (CMI) circuit 244 and associated components in one embodiment. The CMI 244 is a communication channel and control circuit for directing memory and I/O transactions between groups of processor cores 220A-D, I/O bridges 238A-B, and Level-2 cache memory banks 230A-D. The CMI 244 may be implemented in the network processor 100 as the CMI 144, wherein the processor cores 220A-D are implemented as the processor cores 120, I/O bridges 238A-B are implemented as the I/O bridges 138a-b, and the Level-2 cache memory banks 230A-D are implemented as the Level-2 cache 130.

As the number of processor cores implemented in a network processor is increased, providing controlled access to the memory subsystem for such a large number of sources becomes problematic. A first challenge presented in a network processor having a large number of processor cores (e.g., 32) is how to transfer requests from the cores to the memory system. Previous designs have used a ring bus, which can produce higher (and variable) latencies. A second challenge in designing a multiple core chip is servicing the high volume of requests generated by that large a number of cores. A third, similar, challenge involves the structure of the processor core's L1 tags (referred to hereafter as the DUplicate Tags, or DUT), which must accommodate the requirement of each request to lookup and possibly update a DUT. Fourth, the response data must be transferred from the cache back to a FILL bus. With each cache bank having the ability to only service one bus request at a time and each request requiring up to 4 cycles, the FILL buses may not be fully utilized. A fifth challenge involves the data associated with bus store requests, which must be transferred from the request source to the cache bank that will service the request. This issue is comparable to the fourth challenge (involving response data), but with the source and destination reversed. Sixth, the processor cores require access to the devices on the other side of the I/O bridges. Lastly, a seventh challenge involves maintaining memory coherency throughout the memory subsystem.

Embodiments of the present invention provide for processing transactions between the multiple processor cores and the L2 cache and memory subsystem via four sets of Coherent Memory Buses (CMBs) 225A-D. Each CMB 225A-D comprises individual ADD/STORE/COMMIT/FILL buses. The entire grouping of four CMBs 225A-D and I/O bridge buses IOC/IOR are connected together through the Coherent Memory Interconnect (CMI) 244. Likewise, four additional CMBs 235A-D comprise individual ADD/STORE/COMMIT/FILL buses, and connect the cache banks 230A-D to the CMI 244.

The CMBs 225A-D may each support a respective group of processor cores 220A-D. In this example embodiments, each group of processor cores 220A-D comprises 8 processor cores, but may be modified to include additional or fewer cores. In order to provide memory access to the I/O portion of the network processor, two of the buses 225A-B have an IO Bridge (IOB) 238A-B attached. The IOB0 238A may be used to provide the processor cores 220A-D with access to the NCB-side I/O devices via a dedicated I/O Command (IOC) and IO Response (IOR) buses. Both IOB0 238A and IOB1 238B may have access to the L2 cache and memory subsystem by sharing the CMB buses 225A-B respectively with the processor cores 220A-B.

Each of the cache banks 230A-D may include a Level 2 Cache controller (L2C), which controls the transfer of commands and responses between the CMBs 225A-D and the cache banks 230A-D while maintaining the shared memory coherency model of the system. The L2C is described in further detail below with reference to FIG. 6.

By dividing the processor cores 220A-D and I/O bridges 238A-B into four groups, each serviced by a single CMB 225A-D, lower latency arbitration logic may be used. Local arbitration decisions are made between only the processor cores of a group 220A-D (and an I/O bridge 238A-B, in the case of a CMB with an attached 10 bridge), being sources covering a much smaller physical area. Arbitration requests and the granting of those requests can be done in a single cycle, which is a rate that would be unachievable if trying to arbitrate between all processor cores and I/O bridges of the network processor. Additionally, all CMBs 225A-D may have direct connections to the request buffers in the interconnect circuit with the same low, fixed latency. As a result, requests from the cores to the memory system are transferred at a low latency.

In order to service the high volume of requests generated by the large number of processor cores, the L2 cache is divided into the four individual cache banks 230A-D. As a result, the bandwidth of requests that could be serviced is quadrupled. The physical address of each request may be hashed using an exclusive-OR (XOR) function configured to produce a near-random distribution of cache blocks across the 4 cache banks for all common address strides. This converts the spatial locality of the CMB requests to a near-random distribution across the four cache banks 230A-D, allowing better utilization of the four tag lookups per cycle. Conversely, if the L2 cache instead was one uniform structure, only one tag lookup could occur per cycle, severely limiting L2 cache bandwidth. As a result, the network processor can service the high volume of requests generated by the large number of cores. An example configuration of request processing and directing is described below with reference to FIG. 3.

In processing a data request, the CMI 244 must lookup and possibly update the DUT. With 4 buses feeding requests, this process requires up to 4 DUT lookups per cycle. In order to accommodate DUT lookups, the DUT may be divided into 8 sets (also referred to as "channels"), each of which can perform one lookup per cycle. The interconnect circuit 244 is capable of slotting up to 4 CMB requests per cycle to the DUT, provided they need to use different sets. This configuration provides a 2:1 ratio of resource to request, increasing the odds that multiple requests can be serviced in the same cycle. As a result, a network processor core's L1 tags can accommodate the requirement of each request to lookup and update a DUT. A process of updating DUTs is described in further detail below with reference to FIG. 3.

A request to store or retrieve data is transferred form a core of a group of processor cores 220A-D, through a respective bus 225A-D and the CMI 244, to a cache bank 230A-D that will service the request. In order to service several requests from the multiple processor cores, the process of reading the store data from the store source (either an I/O Bridge 238A-B or processor core 220A-D) may be decoupled from the process of writing to the cache bank 230A-D store buffer. This may be accomplished using four 2 read/2 write port custom data buffers. Each buffer may receive data from two CMB 225A-D buses, and sends data to two cache banks 230A-D. This configuration allows each CMB 225A-D STORE bus to provide a given amount (e.g., 128 bytes) store data during each cycle, and allows each cache bank to receive the same amount (e.g., 128 bytes) of store data per cycle, independent of the particular CMB 225A-D or cache bank 230A-D that needs to provide or receive the data. This configuration simplifies the arbitration for the CMB store data requests and the arbitration for writing the cache bank 230A-D buffers, thereby allowing for full utilization of the available bus resources. As a result, data input capacity to the cache banks is fully utilized. A configuration of data buffers is described below with reference to FIG. 4.

A response to a request is provided by a cache bank, and must be transferred from the cache bank back to the CMB 235A-D FILL buses. Each cache bank 230A-D may only be capable of servicing one CMB request at a time, and each request requires up to 4 cycles. In order to keep the CMB 235A-D FILL buses fully utilized, the cache bank 230A-D FILL buffer read port may be decoupled from the CMB 235A-D FILL bus, and a 3-write port bypassable buffer can be implemented in the interconnect circuit 244 to prefetch data destined for the CMB 235A-D FILL bus. This allows up to 3 cache banks to read out response data and queue it for sending to the same bus. The buffers provide for coordinating the CMB 235A-D FILL buses and the cache bank 230A-D FILL ports to maximize utilization. As a result, data output capacity from the cache banks is fully utilized. This configuration of FILL buffers is described in further detail below with reference to FIG. 5.

In addition to the cache banks 230A-D, the processor cores 220A-D require access to the devices on the other side of the IOBs 238A-B (e.g., interface units 122*a-b* and other devices on the I/O bus 142 of the network processor 100 in FIG. 1). This access is provided via a dedicated I/O Command (IOC) bus to IOB0 238A. The CMB 235A ADD/STORE buses provide the requests from the processor cores 220A-D and the interconnect circuit 244 may translate those requests into the form needed for the IOC bus. Additionally, the interconnect circuit 244 must handle arbitration for the single IOC bus. When I/O bridge 238A provides the response data, it places it on the I/O Response (IOR) bus. The interconnect circuit 244 then receives this data, formats it appropriately, and returns the data to the requesting core via the CMB 235A-D FILL bus. As a result, the processor cores 220A-D are provided with access to the devices across the IOBs 238A-B.

In order to maintain memory subsystem coherency, invalidates and commits generated by store requests must be considered in view of the multiple bus structure. When a processor core 220A-D or I/O device (through I/O bridge 238A-B) requests a store operation, it receives a commit from the L2C of the respective cache bank 230A-D to notify it that other core or I/O devices will now be able to see the data from that store. By waiting for all outstanding commits for its own stores, a source can determine that its earlier store will be visible before a subsequent store. This provides a mechanism to signal other cores or devices that they can proceed. Because cores can be on different buses than the core/device that generated a store, there is an important ordering relationship between the commit and its associated L1 invalidates. If the signaled core receives the signal before it receives the invalidate it could see old data, causing loss of coherency in the memory system. This loss of coherency can be prevented by the L2C of the cache bank 230A-D by refraining from transmitting the commit until it is first confirmed that the invalidates for all buses have been sent to the processor cores 220A-D across all buses 225A-D. In some embodiments, the circuit can be configured to guarantee that the invalidates reach the L1 in less time than the time required for the commit to reach the store source and a subsequent signal to reach the core receiving the invalidate. As a result, memory coherency is maintained.

Figure 3:
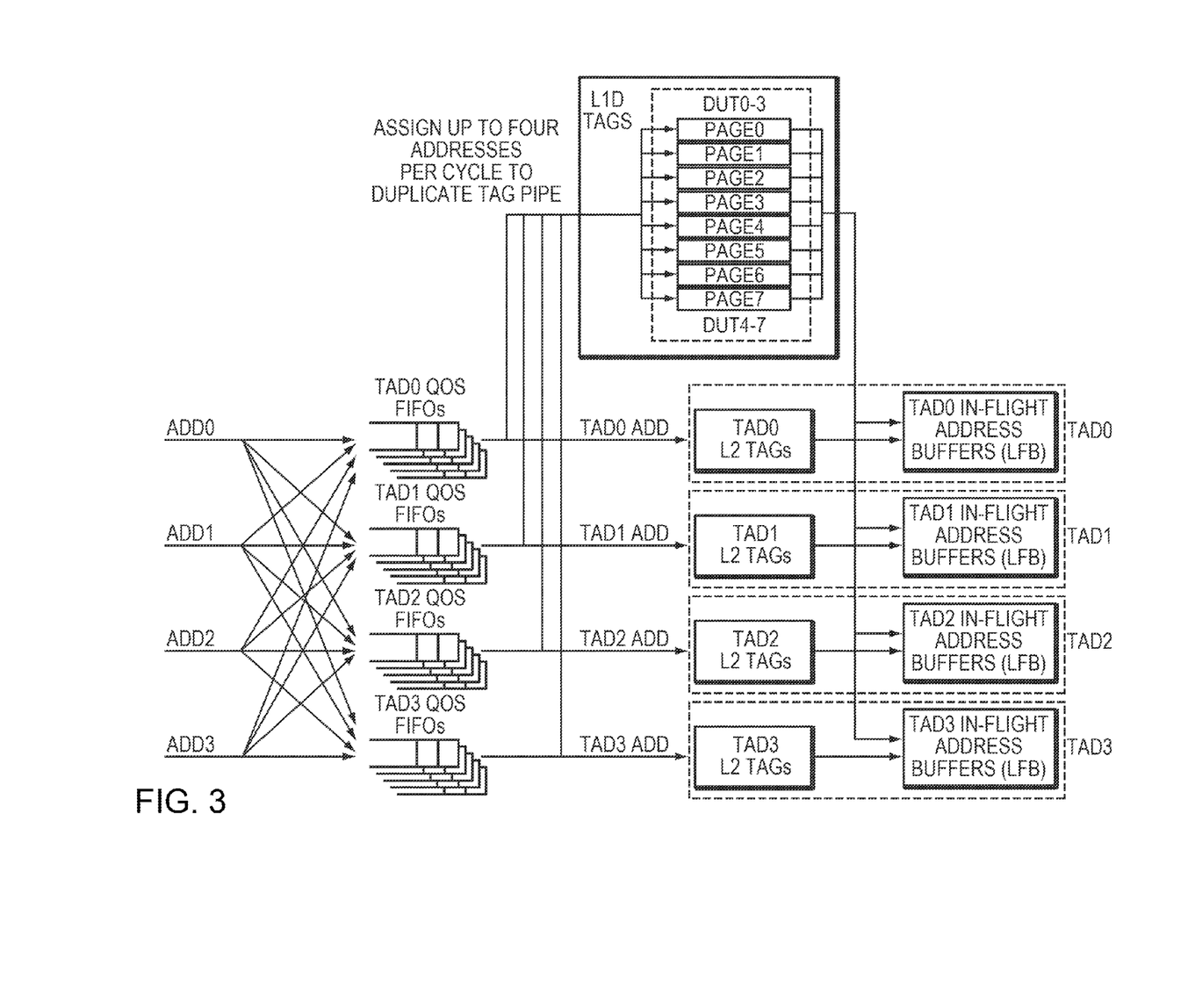
FIG. 3 is a block diagram illustrating processing of requests to the cache banks in one embodiment.

FIG. 3 is a block diagram illustrating processing of requests to the cache banks in one embodiment. As described above with reference to FIG. 2, the core-side CMBs 225A-D and the cache-side CMBs 235A-D both include ADD buses, which carry address and control information that initiates memory transactions. The source of the transactions may be the processor cores 220A-B and the IOBs 238A-B. The CMI interconnect circuit 244 provides for processing and forwarding addresses from the core-side CMBs 225A-D to the cache-side CMB 235A-D, as shown in FIG. 3. Here, with reference to FIG. 2, the address of the requests are received at the respective ADD buses (ADD0-ADD3) of the CMBs 225A-D to any of the FIFO buffers of the cache banks 230A-D (also referred to as "TADs" (TAD0-TAD1)). Any of the four ADD buses can direct a transaction to any cache bank 230A-D. The address of the request selects the cache bank 230A-D that processes the transaction, irrespective of which ADD bus the transaction was initiated from. The physical address of each request may be hashed using an exclusive-OR (XOR) function configured to produce a near-random distribution of cache blocks across the four cache banks 230A-D (TAD0-TAD3) for all common address strides. This converts the spatial locality of the CMB requests to a near-random distribution across the four cache banks 230A-D (TAD0-TAD3), allowing better utilization of the four tag lookups per cycle.

A transaction arriving on an ADD bus first enters one of the FIFOs for the destination cache bank. Each FIFO can buffer up to four ADD bus transactions every cycle. An algorithm determines the order that addresses are further processed.

A scheduler at the CMI interconnect circuit 244 may determine which transactions may exit the FIFOs. Up to four transactions (one possible from each of the four TADs) contend each cycle for L1D tag pipes in the circuit 244. The L1D tag pipes (shown as Pipes 0-7) have copies of the L1 data-cache tags (i.e. they are duplicate tags, or DUTs). The L1D tag pipes determine whether the transaction invalidates a copy of the block in an L1 data cache. If so, then the interconnect circuit 244 will eventually send an L1D cache invalidate command on the COMMIT and FILL buses for the transaction.

The interconnect circuit 244, upon receiving a request, may analyze the request's address (or part of the address, such as address bits <9:7>) to select which L1D tag pipe is used by each transaction. If each of the up to four transactions presented all differ in address bits <9:7>, then the crossbar schedules all transactions during the cycle. The implementation splits the DUT into DUT0-3, which contains L1D tag pipes 0-3, and DUT4-7, which contains L1D tag pipes 4-7.

When the interconnect circuit 244 schedules a transaction from a cache bank FIFO, the transaction simultaneously enters both an L1D tag pipe and the L2 tag pipe in the interconnect circuit 244 (via the ADD bus) and the cache bank, respectively. The state of the DUT is updated to match the state of the L1 tags. The cache bank in-flight buffer eventually completes the transaction using results from these tag pipes. Bypasses (not shown) can avoid any extra FIFO latency when there is no contention for DUT and cache bank resources.

Each request may require a lookup of the cache bank's L2 tags, as well as the state of all processor cores' L1 tags. This state is held as the DUT, being a copy of the L1 tags in the L2. Because the address hashing function that distributes the requests evenly across the cache banks may not be used for the L1, as the bits required for the hash function may not be available in time, In order to provide enough bandwidth to perform 4 lookups per cycle in the DUT, the DUT may be split into 8 separate sets ("channels") where each address maps into one channel. Because only 4 addresses are selected per cycle and there are 8 DUT channels it is likely that more than 1 request (up to a maximum of 4) will be selected based on the normal address distribution.

Figure 4:
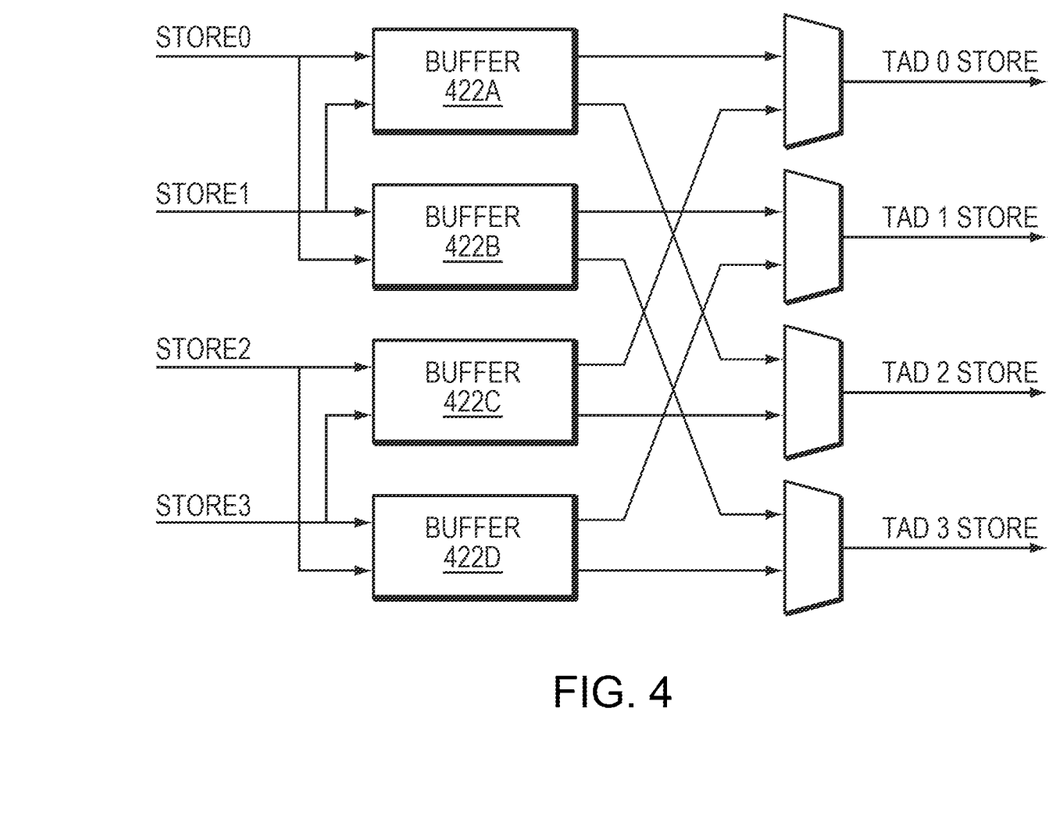
FIG. 4 is a block diagram illustrating buffers implemented in store requests to the cache banks.

FIG. 4 is a block diagram illustrating buffers implemented in requests to the cache banks. As described above with reference to FIG. 2, the cache-side CMBs 235A-D include STORE buses, which carry data to be stored to the cache banks 230A-D during memory transactions. A request to store or retrieve data is transferred form a core of a group of processor cores 220A-D, through a respective bus 225A-D and the CMI 244, to a cache bank 230A-D that will service the request. In order to service several requests from the multiple processor cores, four 2 read/2 write port data buffers 422A-D receive data from the STORE buses (STORE0-STORE1). Each buffer 422A-D may receive data from two CMB 225A-D STORE buses, and may send data to two cache banks 230A-D. This configuration allows each CMB 225A-D STORE bus to provide a given amount (e.g., 128 bytes) store data during each cycle, and allows each cache bank to receive the same amount (e.g., 128 bytes) of store data per cycle, independent of the particular CMB 225A-D or cache bank 230A-D that needs to provide or receive the data.

Figure 5:
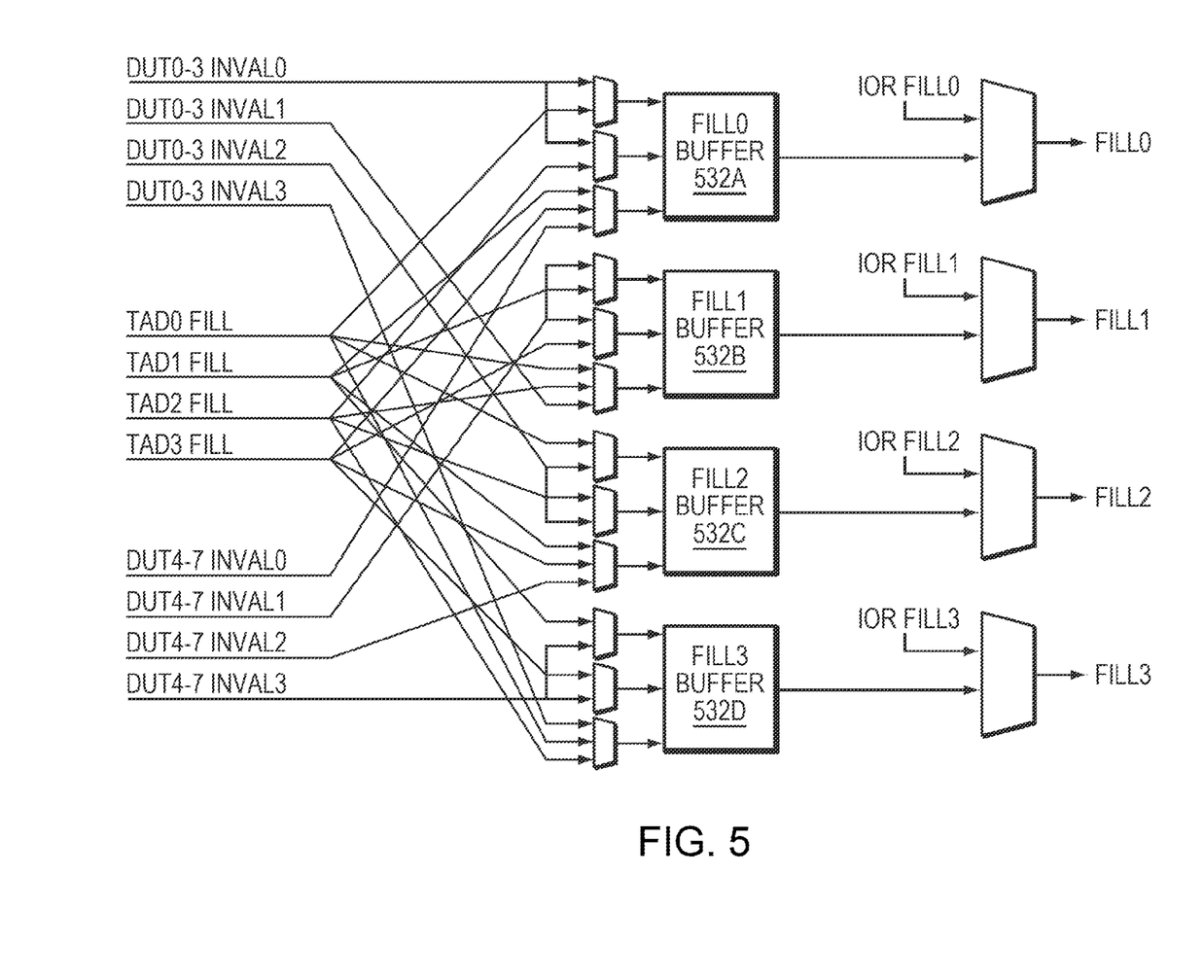
FIG. 5 is a block diagram illustrating buffers implemented in data output from the cache banks.

FIG. 5 is a block diagram illustrating buffers implemented in data output from the cache banks. As described above with reference to FIG. 2, a response to a request is provided by a cache bank, and must be transferred from the cache bank back to the CMB 235A-D FILL buses (shown in FIG. 5 as TAD0 FILL ... TAD1 FILL). Each cache bank 230A-D may only be capable of servicing one CMB request at a time, and each request requires up to 4 cycles. In order to keep the CMB 235A-D FILL buses fully utilized, FILL buffers 532A-D can be implemented to decouple the cache bank 230A-D read port from the CMB 235A-D FILL bus. The FILL buffers 532A-D may be 3-write port bypassable buffers that can be implemented in the interconnect circuit 244 to prefetch data destined for the CMB 235A-D FILL bus. This allows up to 3 cache banks to read out response data and queue it for sending to the same bus. The buffers 532A-D provide for coordinating the CMB 235A-D FILL buses and the cache bank 230A-D FILL ports to maximize utilization of each of the CMB 235A-D FILL buses.

Figure 6:
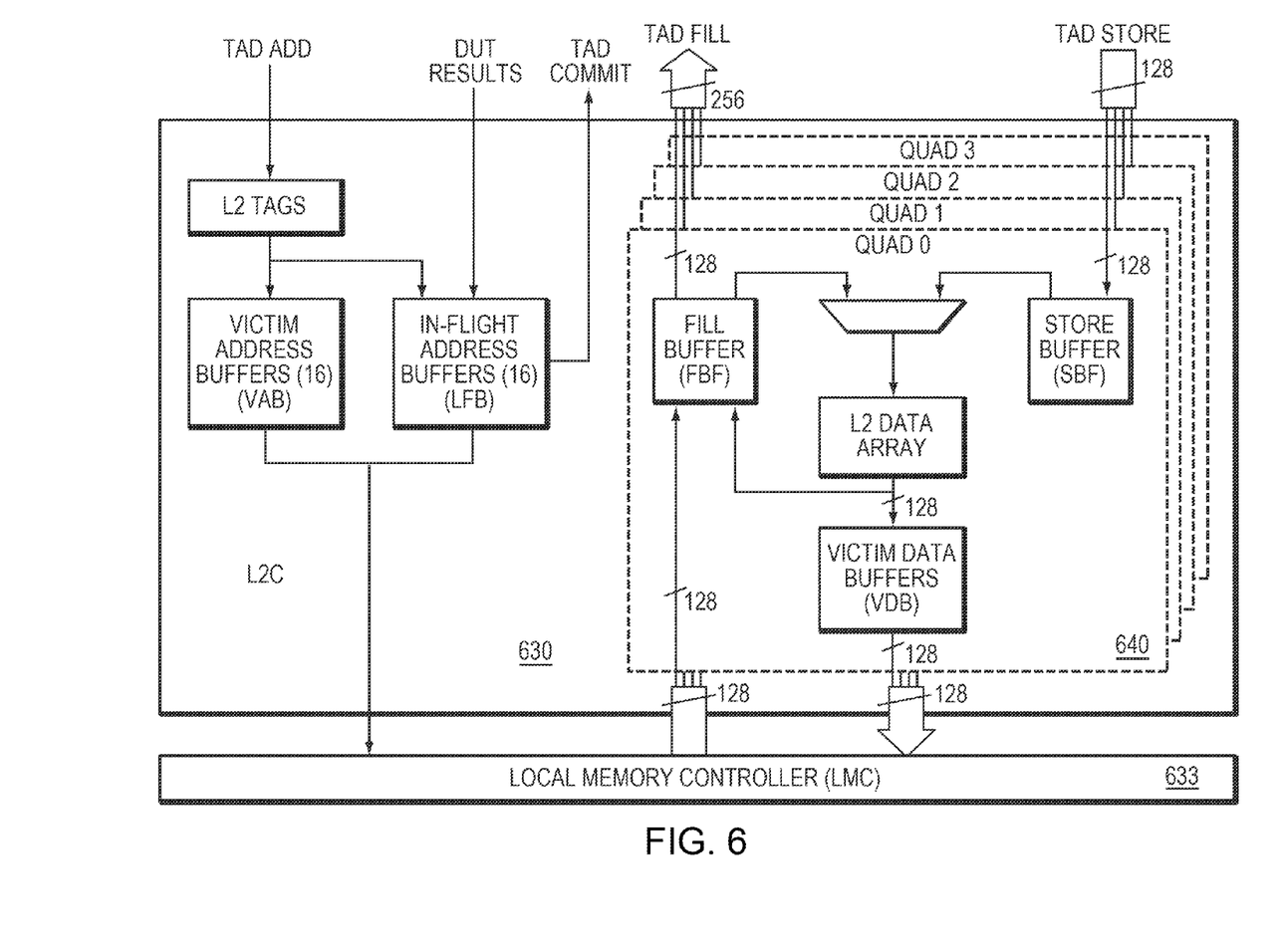
FIG. 6 is a block diagram of a cache bank in one embodiment.

FIG. 6 is a block diagram of the L2C control circuitry present in each of the cache banks 230A-D described above with reference to FIG. 2. The cache bank contains both the cache tags and data for its portion of the L2 cache. Four Quads contain the data. Each Quad has 256 KB of the L2 cache. A cache bank also includes address and data buffers. The address buffers include the inflight address buffer (LFB) that tracks all received L2 read and write operations, and the victim address buffer (VAB) that tracks all blocks that are written to DRAM (via the LMC). L2C holds and processes up to 16 simultaneous L2/DRAM transactions in its LFB, and also manages up to 16 in-flight L2 cache victims/write-through operations in the VAB/VBF.

The data buffers include fill buffers (FBF), which are used whenever data is read from the L2 cache or DRAM, store buffers (SBF), which are used for all STORE transactions and victim data buffers (VDB), which are used to write data to DRAM. For L2/DRAM fill transactions, L2C returns data from either the L2 cache or memory via a FBF entry associated with the LFB entry. For L2/DRAM store transactions, L2C first deposits STORE bus data into the SBF entry associated with the LFB entry, then either updates the cache or writes a full cache block store straight to DRAM. Except for store operations to all bytes in a cache block, all L2/DRAM transactions that miss in the L2 cache require a DRAM fill operation. Partial cache block store operations need the DRAM fill operation to obtain the bytes that are not stored. L2C puts DRAM fill data into the FBF, then writes it to the L2 cache, if necessary, and forwards it onto the FILL bus, if necessary.

While this invention has been particularly shown and described with references to example embodiments thereof, it will be understood by those skilled in the art that various changes in form and details may be made therein without departing from the scope of the invention encompassed by the appended claims.

What is claimed is:

1. A computer system on a computer chip comprising:
   an interconnect circuit;
   a plurality of memory buses, each bus connecting a respective group of plural processor cores to the interconnect circuit; and
   a cache divided into a plurality of banks, each bank being connected to the interconnect circuit via an individual bus;
   the interconnect circuit configured to distribute a plurality of requests received from the plural processor cores among the plurality of banks, wherein the interconnect circuit transforms the requests by modifying an address component of the requests.

2. The system of claim 1, wherein the interconnect circuit performs a hash function on each of the requests, the hash function providing a pseudo-random distribution of the requests among the plurality of banks.

3. The system of claim 1, wherein the interconnect circuit is configured to maintain tags indicating a state of an L1 cache coupled to one of the plural processor cores, and wherein the interconnect circuit is further configured to direct tags in the plurality of requests to a plurality of channels thereby processing the respective tags concurrently.

4. The system of claim 1, wherein the interconnect circuit further comprises a plurality of data output buffers, each of the data output buffers configured to receive data from each of the plurality of banks and output data through a respective one of the plurality of memory buses.

5. The system of claim 1, wherein the interconnect circuit further comprises a plurality of request buffers, each of the request buffers configured to receive requests from each group of plural processors and output the request to a respective one of the plurality of banks.

6. The system of claim 1, further comprising at least one bridge circuit coupled to at least one of the memory buses, the at least one bridge circuit connecting the plural processor cores to at least one on-chip co-processor.

7. The system of claim 1, wherein the banks are configured to delay transmitting a commit signal to the plural processor cores, the banks transmitting the commit signal in response to receiving an indication that invalidate signals have been transmitted to the entirety of the plural processor cores.

8. The system of claim 1, wherein the interconnect circuit and plurality of memory buses are configured to control invalidates to reach an L1 cache in less time than a time required for a commit to reach one of the plurality of banks and a subsequent signal to reach one of the plural processor cores receiving the invalidate.

* * * * *